United States Patent
Horner et al.

(10) Patent No.: US 9,096,320 B2
(45) Date of Patent: Aug. 4, 2015

(54) CABIN PRESSURE THRUST RECOVERY OUTFLOW VALVE WITH SINGLE DOOR

(75) Inventors: Darrell Horner, Oro Valley, AZ (US); Justin A. Tanner, Queen Creek, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1365 days.

(21) Appl. No.: 12/878,776

(22) Filed: Sep. 9, 2010

(65) Prior Publication Data
US 2012/0064813 A1    Mar. 15, 2012

(51) Int. Cl.
*B64D 13/02*    (2006.01)
*B64D 13/04*    (2006.01)

(52) U.S. Cl.
CPC ............... *B64D 13/04* (2013.01); *B64D 13/02* (2013.01)

(58) Field of Classification Search
USPC ................. 454/71, 72, 73; 251/212, 298
See application file for complete search history.

(56) References Cited

U.S. PATENT DOCUMENTS

| | | | |
|---|---|---|---|
| 3,436,039 A | 4/1969 | Seger et al. | |
| 3,544,045 A | 12/1970 | Butscher | |
| 4,960,249 A * | 10/1990 | Signoret et al. | 454/74 |
| 6,116,541 A * | 9/2000 | Chuang et al. | 454/71 |
| 6,273,136 B1 * | 8/2001 | Steinert et al. | 251/279 |
| 7,198,062 B2 | 4/2007 | Hoffman et al. | |
| 2009/0308978 A1 | 12/2009 | Kelnhofer | |
| 2010/0096503 A1 * | 4/2010 | Tanner et al. | 454/71 |
| 2010/0291852 A1 * | 11/2010 | Steinert et al. | 454/71 |
| 2011/0147633 A1 * | 6/2011 | Schiek et al. | 251/298 |
| 2013/0059516 A1 * | 3/2013 | Horner et al. | 454/71 |
| 2013/0059517 A1 * | 3/2013 | Horner et al. | 454/71 |

FOREIGN PATENT DOCUMENTS

EP    2428446 A2 *    3/2012

* cited by examiner

*Primary Examiner* — Alissa Tompkins
*Assistant Examiner* — Phillip E Decker
(74) *Attorney, Agent, or Firm* — Ingrassia Fisher & Lorenz, P.C.

(57) ABSTRACT

A single valve door thrust recovery outflow valve is provided that does not rely on a relatively large and expensive actuator to move it, and does not create unwanted drag during aircraft cruise operations. The valve includes a valve frame, a valve door, and an aerodynamic flap. The valve door is rotationally coupled to the valve frame, is adapted to receive a drive torque, and is configured, upon receipt of the drive torque, to rotate between a closed position, a full-open position, and a plurality of partial-open positions between the closed position and the full-open position. The aerodynamic flap is coupled to the valve door. When the valve door is in the closed position and in numerous partial-open positions, the aerodynamic flap makes the thrust recovery outflow valve aerodynamically clean.

20 Claims, 6 Drawing Sheets

CABIN PRESSURE THRUST RECOVERY OUTFLOW VALVE WITH SINGLE DOOR

TECHNICAL FIELD

The present invention generally relates to aircraft cabin pressure thrust recovery systems, and more particularly relates to a cabin pressure thrust recovery outflow valve.

BACKGROUND

Aircraft are commonly equipped with Cabin Pressure Control Systems (CPCSs), which maintain cabin air pressure within a desired range to increase passenger comfort during flight. A typical CPCS may include a controller, an actuator, and an outflow valve. The outflow valve is typically mounted on either a bulkhead of the aircraft or on the outer skin surface of the aircraft, and selectively fluidly couples the aircraft cabin and the atmosphere outside of the aircraft. During operation, the controller commands the actuator to move the outflow valve to various positions to control the rate at which pressurized air is transferred between the aircraft cabin and the outside atmosphere, to thereby control the pressure and/or rate of change of pressure within the aircraft cabin. The controller may be configured to command the actuator to modulate the outflow valve in accordance with a predetermined schedule or as a function of one or more operational criteria. For example, the CPCS may additionally include one or more cabin pressure sensors to sense cabin pressure and supply pressure signals representative thereof to the controller. By actively modulating the outflow valve, the controller may maintain aircraft cabin pressure and/or aircraft cabin pressure rate of change within a desired range.

In some aircraft, the outflow valve may be positioned on the aircraft outer skin surface such that, when pressurized air is exhausted from the cabin, the exhausted air may provide additional forward thrust to the aircraft. Thus, outflow valves may sometimes be referred to as thrust recovery valves. Modern thrust recovery valves often include two valve door elements with multiple actuation linkages to enable proper sealing, reduce drag, and optimize valve door positioning for cruise thrust creation. Some earlier thrust recovery valves include a single, scoop-type valve door. These single valve doors are typically hinged on an end of the trailing edge. While this configuration makes the valve door aerodynamically acceptable, it can also make the actuation torque needed to drive the valve undesirably large. This, in turn, can result in relatively large and relatively expensive actuators and drive linkages being used.

Single valve door thrust recovery valves with the hinge point midway on the valve door, to thereby reduce the drive torque, have been envisioned. Unfortunately, these single valve door thrust recovery valves exhibit certain drawbacks. For example, in order to move the valve to the positions necessary to both seal and to not protrude during aircraft cruise operations, the valve door must be located inboard of the fuselage skin, which creates unwanted drag.

Hence, there is a need for a single valve door thrust recovery valve that does not rely on a relatively large and expensive actuator to move it, and/or does not create unwanted drag during aircraft cruise operations. The present invention addresses at least these needs.

BRIEF SUMMARY

In one embodiment, an aircraft cabin pressure control system thrust recovery outflow valve includes a valve frame, a valve door, and an aerodynamic flap. The valve frame is configured to be mounted on an aircraft exterior skin, and includes an inner surface, an outer surface, a forward seat, and an aft seat. The inner surface defines a flow passage through the valve frame. The valve door is rotationally coupled to the valve frame, and includes a leading edge, a trailing edge, and two side edges. The valve door is adapted to receive a drive torque and configured, upon receipt of the drive torque, to rotate between a closed position, a full-open position, and a plurality of partial-open positions between the closed position and the full-open position. The aerodynamic flap includes a first end and a second end. The first end is coupled to the valve door, and the second end is biased toward the trailing edge of the valve door.

In another embodiment, an aircraft cabin pressure control system thrust recovery outflow valve includes a valve frame, a valve door, and an aerodynamic flap. The valve frame is configured to be mounted on an aircraft exterior skin, and includes an inner surface, an outer surface, a forward seat, and an aft seat. The inner surface defines a flow passage through the valve frame. The valve door is rotationally coupled to the valve frame, and includes a leading edge and a trailing edge. The valve door is adapted to receive a drive torque and is configured, upon receipt of the drive torque, to rotate between a closed position, a full-open position, and a plurality of partial-open positions between the closed position and the full-open position. The aerodynamic flap includes a first end and a second end. The first end is coupled to the valve door, and the second end is biased toward the trailing edge of the valve door. The valve frame and valve door are configured such that: (1) when the valve door is in the closed position, the leading edge of the valve door engages the forward seat of the valve frame, and the trailing edge of the valve door engages the aft seat of the valve frame; (2) when the valve door is in any open position, the leading edge of the valve door does not engage the forward seat of the valve frame; (3) when the valve door is between the closed position and a predetermined partial-open position, the trailing edge of the valve door engages the aft seat of the valve frame; and (4) when the valve door is between the predetermined partial-open position and the full-open position, the trailing edge of the valve door does not engage the aft seat of the valve frame.

Furthermore, other desirable features and characteristics of the cabin pressure control system thrust recovery outflow valve will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
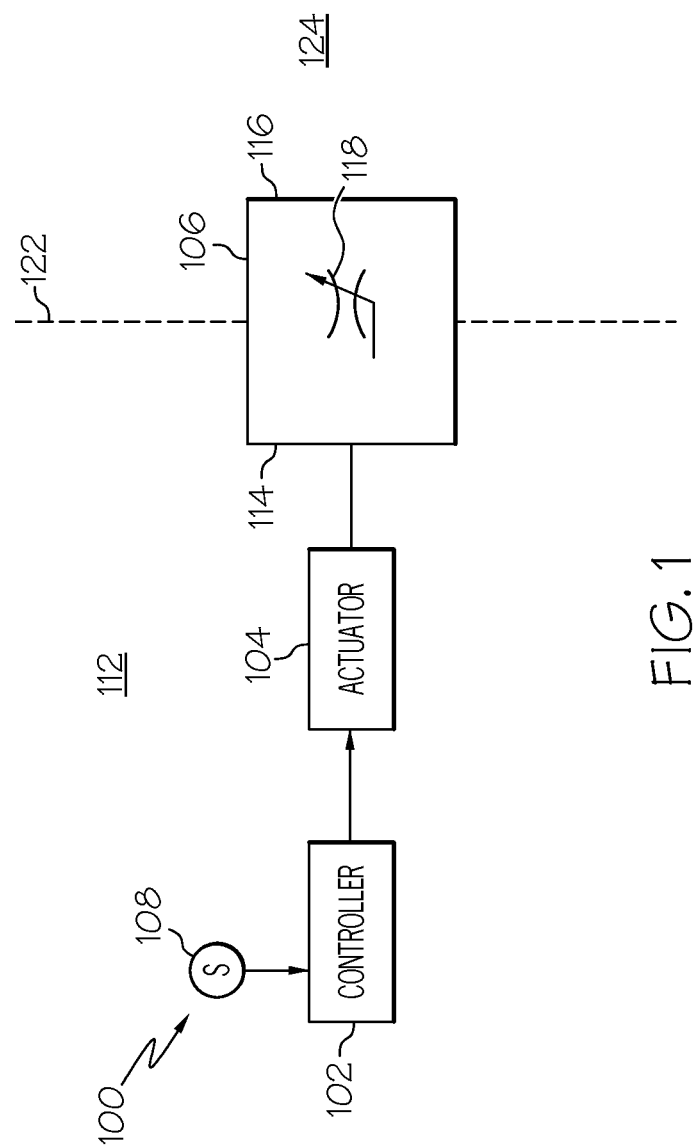
FIG. 1 is a functional block diagram of an exemplary cabin pressure control system (CPCS)

Turning first to FIG. 1, a simplified block diagram of an exemplary aircraft cabin pressure control system (CPCS) 100 is depicted. In the depicted embodiment, the CPCS includes a controller 102, an actuator 104, and a thrust recovery outflow valve 106. The controller 102 is operatively (e.g., electrically) coupled to the actuator 104, which is, in turn, mechanically coupled to the thrust recovery outflow valve 106. During operation of the CPCS 100, the controller 102 commands the actuator 104 to move the thrust recovery outflow valve 106 to various positions, to thereby modulate cabin pressure and/or cabin pressure rate-of-change.

It will be appreciated that the controller 102 may command the actuator 104 to move the thrust recovery outflow valve 106 in accordance with a predetermined schedule or as a function of one or more sensed parameters. In the depicted embodiment, the CPCS 100 further includes one or more cabin pressure sensors 108 (only one shown for clarity) that sense pressure within the aircraft cabin 112 and supply a cabin pressure sensor signal representative thereof to the controller 102. It will be additionally appreciated that the CPCS 100 may be implemented with various other sensors, such as one or more non-illustrated cabin temperature sensors, one or more non-illustrated cabin-to-atmosphere differential pressure sensors, one or more non-illustrated atmospheric temperature sensors, and one or more outflow valve position sensors, just to name a few.

Figure 2:
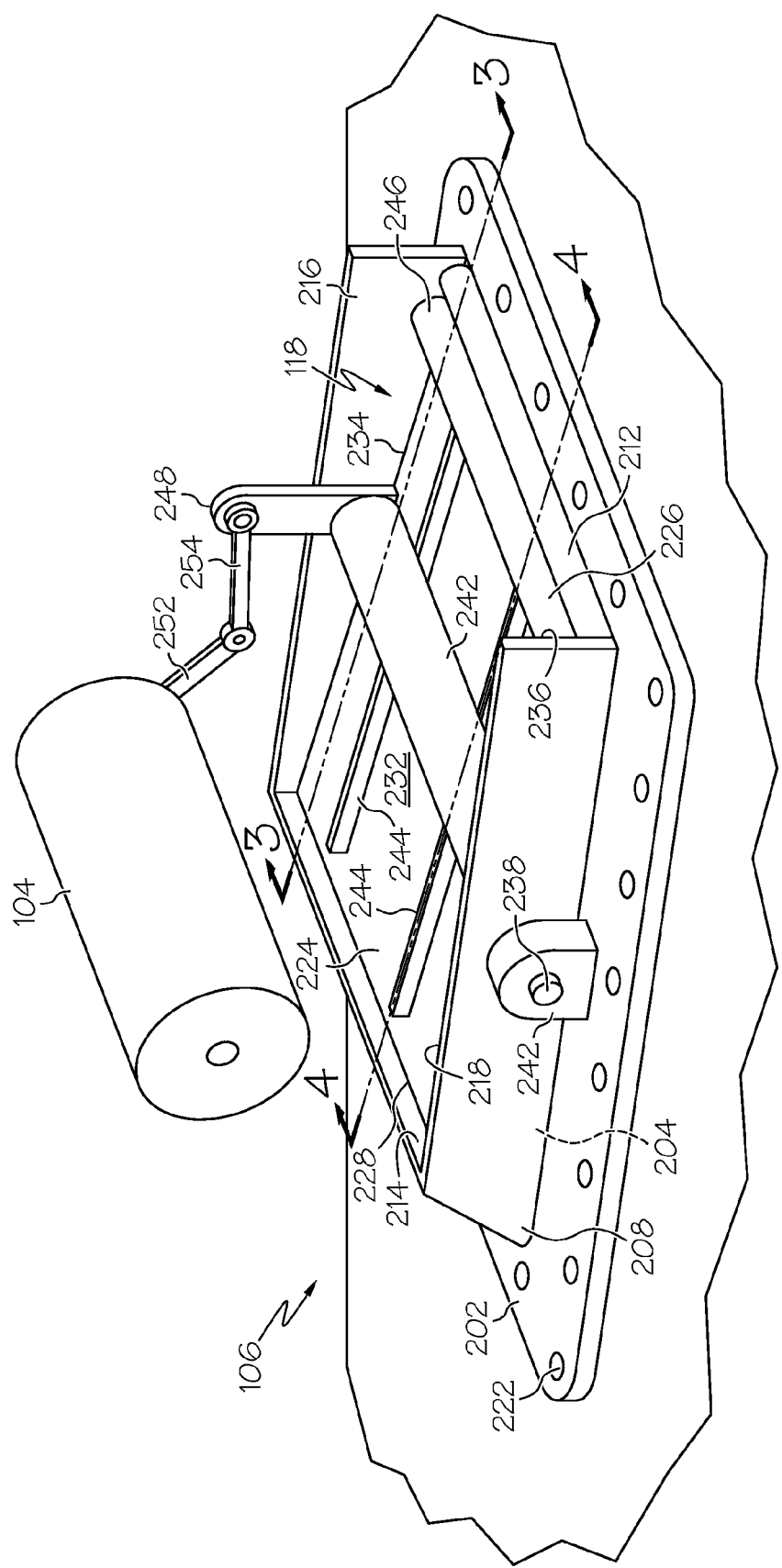
FIG. 2 depicts a perspective plan view of one example embodiment of a thrust recovery outflow valve that may be used in the system of FIG. 1.

The thrust recovery outflow valve 106 includes an inlet flow port 114, an outlet flow port 116, and an interposed valve 118. The thrust recovery outflow valve 106 is, for example, preferably mounted on the aircraft exterior skin 122 such that the inlet flow port 114 is exposed to the aircraft cabin 112 and the outlet flow port 116 is exposed to the atmosphere outside of the aircraft 124. Thus, during flight, the pressure in the aircraft cabin 112 (e.g., cabin altitude) and/or the rate of change of aircraft cabin altitude, can be controlled by positioning the valve element 118, via the actuator 104. In one specific implementation, the thrust recovery outflow valve 106 is located in the rear underbelly of the aircraft proximate the tail. Moreover, in some implementations, the thrust recovery outflow valve 106 may be positioned so that additional forward thrust is supplied to the aircraft when pressurized air is venting from the aircraft cabin 112 to the atmosphere 124 outside the aircraft. It will be appreciated that the thrust recovery outflow valve 106 may be variously configured to implement this functionality. One particular physical implementation is depicted in FIGS. 2 and 3, and with reference thereto will now be described.

The exemplary physical implementation of the thrust recovery outflow valve 106 includes a valve frame 202, the valve element 118, and the actuator 104. The valve frame 202 is configured to be mounted on the aircraft exterior skin 122, and includes an inner surface 204, an outer surface 208, a forward seat 212, and an aft seat 214. The inner surface 204 defines a flow passage 302 (see FIG. 3) through the valve frame 202 between the inlet flow port 114 and the outlet flow port 116. As FIG. 2 also depicts, the valve frame 202 may additionally include a first side seat 216, a second side seat 218, and a plurality of fastener openings 222. The first and second side seats 216, 218 both extend between the forward and aft seats 212, 214, and the fastener openings 222 are used to secure the thrust recovery outflow valve 106 to the aircraft exterior skin 122. It will be appreciated that the depicted shapes and configurations of the forward seat 212, the aft seat 214, and the first and second side seats 216, 218 are merely exemplary of one embodiment, and that the shapes and configurations thereof may vary.

Figure 3:
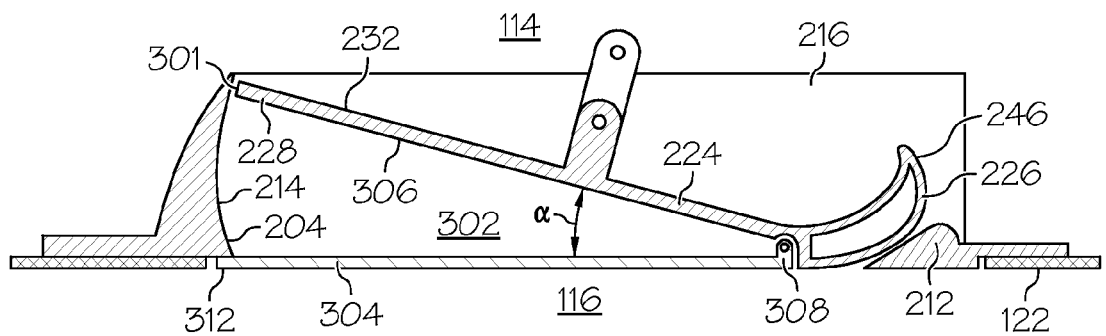
FIG. 3 depicts a cross section view of the exemplary thrust recovery outflow valve taken along line 3-3 in FIG. 2.

The valve element 118 includes a valve door 224 and, as shown most clearly in FIG. 3, an aerodynamic flap 304. The valve door 224 is rotationally coupled to the valve frame 202, and includes a leading edge 226, a trailing edge 228, a first side 232, a second side 306 (see FIG. 3), and two side edges—a first side edge 234 and a second side edge 236 (not fully visible in FIG. 2). Although the manner in which the valve door 224 is rotationally coupled to the valve frame 202 may vary, in the depicted embodiment the valve door 224 is rotationally coupled to the valve frame 202 via a plurality of hinges 238 (only one visible in FIG. 2). Preferably, the hinges 238 are disposed in hinge mounts 242 on the valve frame 202 and valve door 224. The hinge mounts 242 are preferably located such that any applied torque that closes the valve door 224 will overcome any applied torque that opens the valve door 224. The applied torque may be from a multitude of sources, including aerodynamic or cabin-to-ambient differential pressure loading. The location of the hinge mounts 242 can be optimized to balance the applied closing and opening torque, while still ensuring that the applied closing torque overcomes the applied opening torque, so that the location of the hinge mounts 242 also reduces the amount of torque that the actuator 104 needs to supply to the valve door 224.

The valve door 224 is coupled to receive a drive torque from the actuator 104 and is configured, upon receipt of the drive torque, to rotate between a closed position, a full-open position, and a plurality of partial-open positions between the closed position and the full-open position. In the closed position, which is the position depicted in FIGS. 2 and 3, the valve door 224 is disposed at a non-zero angle ($\alpha$) relative to the inlet flow port 114. The reason for this will become apparent when the operation of the valve element 118 is described further below.

To provide sufficient sealing between the valve door 224 and the aft seat 214 and the first and second side seats 216, 218, one or more seals 301 (see FIG. 3) are preferably coupled to the valve door 224. The seals 301 may be coupled to the first side 232 of the valve door 224, adjacent the trailing edge 228 and the first and second side edges 234, 236. Alternatively, non-illustrated seal grooves may be formed in the trailing edge 228 and the first and second side edges 234, 236, and the one or more seals 301 may be disposed within these grooves. No matter the specific manner of coupling the one or more seals 301 to the valve door 224, the one or more seals 301 engage the valve frame 202, and more specifically the aft seat 214 and the first and second side seats 216, 218, when the valve element 118 is in the closed position and, as will be described in more detail further below, in a plurality of partial-open positions.

The valve door 224 may also be implemented with various other structural features. For example, the depicted valve door 224 includes a plurality of structural ribs 244, and a bellmouth structure 246. The structural ribs 244, if included, are formed on the valve door first side 232, which is the side that faces the interior of the aircraft, and provide added structural strength to the valve door 224. The structural ribs 244 may, at least in some embodiments, be hollow. The bellmouth structure 246 comprises, or is otherwise coupled to, the leading edge 226 of the valve door 224. The bellmouth structure 246, if included, is preferably curved and is configured to condition fluid flow through the thrust recovery outflow valve 106, to optimize thrust and reduce flow noise, when the valve element 118 is in an open position. The valve door 224 is preferably manufactured from any one of numerous non-metallic composite materials, thereby exhibiting a relatively light weight. It will be appreciated that numerous metallic materials could also be used.

Figure 4:
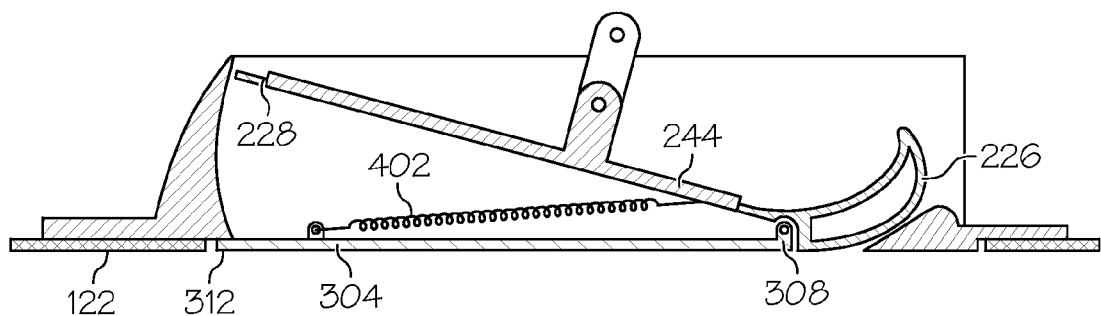
FIG. 4 depicts a partial cross section view of the exemplary thrust recovery outflow valve taken along line 4-4 in FIG. 2.
Figure 5:
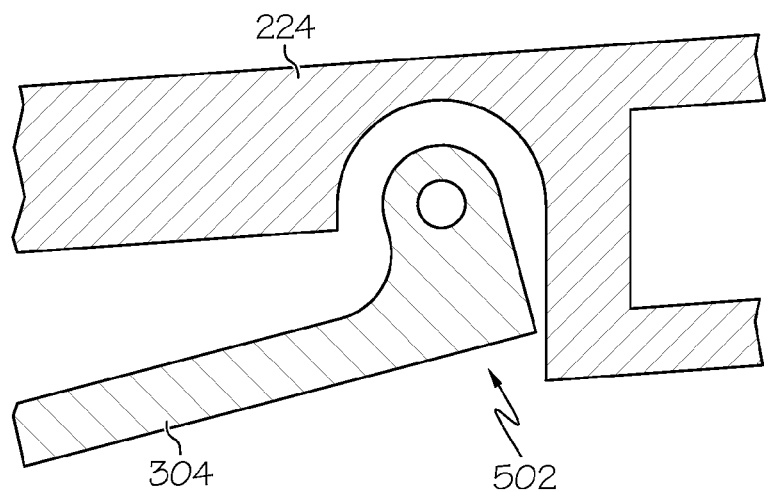
FIG. 5 depicts a close-up view of an edge of the exemplary thrust recovery outflow valve of FIG. 2 to illustrate a stop feature.

The aerodynamic flap 304 includes a first end 308, which is coupled to the second side 306 of the valve door 224, and a second end 312, which is biased toward the trailing edge 228 of the valve door 224. In one embodiment, the first end 308 of the aerodynamic flap 304 is rotationally coupled to the valve door second side 306. In this embodiment, the valve element 118 additionally includes a spring 402. The spring 402, as depicted in FIG. 4, is coupled between the valve door 224 and the aerodynamic flap 304 and may, for example, extend through one of the structural ribs 244. The spring 402 provides the bias force that urges the second end 312 of the aerodynamic flap 304 toward the trailing edge 228 of the valve door 224. In this embodiment, the valve door 224 and aerodynamic flap 304 are also configured to implement a stop feature 502. The stop feature 502, which is depicted most clearly in FIG. 5, limits rotation of the aerodynamic flap 304 in the unlikely event the spring 402 were to be rendered inoperable.

Figure 6:
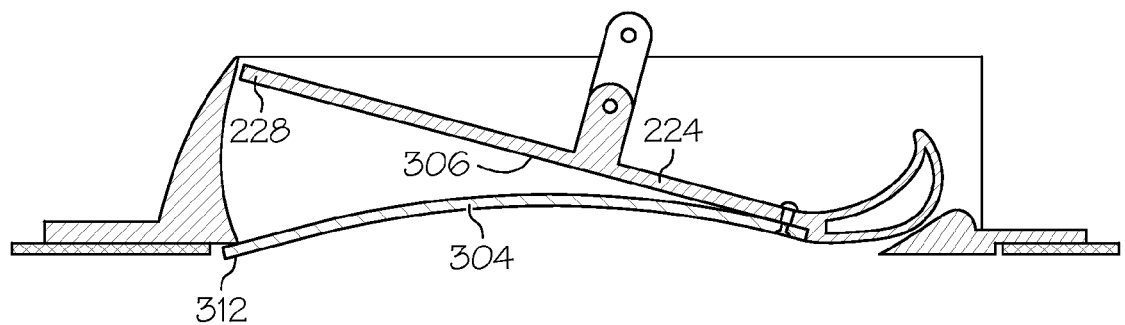
FIG. 6 depicts a cross section view of the exemplary thrust recovery outflow valve taken along line 3-3 in FIG. 2, and which includes an alternative aerodynamic plate.

In another embodiment, the first end 308 of the aerodynamic flap 304 is non-rotationally coupled to the valve door second side 306. In this embodiment, which is depicted in FIG. 6, the aerodynamic flap 304 comprises a flexible material that has sufficient elasticity to exhibit natural spring characteristics. As such, the aerodynamic flap 304 would itself bias its second end 312 toward the trailing edge 228 of the valve door 224.

As noted above, the actuator 104 supplies the drive torque to, and thus positions, the valve door 224. Although the specific configuration, implementation, and location of the actuator 104 may vary, in the depicted embodiment the actuator 104 is preferably implemented using an electric rotary actuator, and is preferably disposed over, and spaced apart from, the first side 232 of the valve door 224. Most preferably, the actuator 104 is disposed over the aft half of the valve door 224, which provides compactness and aids in actuator installation. The actuator 104 is also preferably coupled to the first side 232 of the valve door 224 via a plurality of links. In the depicted embodiment, this includes a door link 248, a drive link 252, and a secondary link 254. The door link 248 is fixedly coupled to, and extends perpendicular from, the first side 232 of the valve door 224. The drive link 252 is coupled to the actuator 104 to receive the drive torque therefrom, and the secondary link 254 is coupled between the drive link 252 and the door link 248 to transfer the drive torque from the actuator 104 to the valve door 224.

Figure 7:
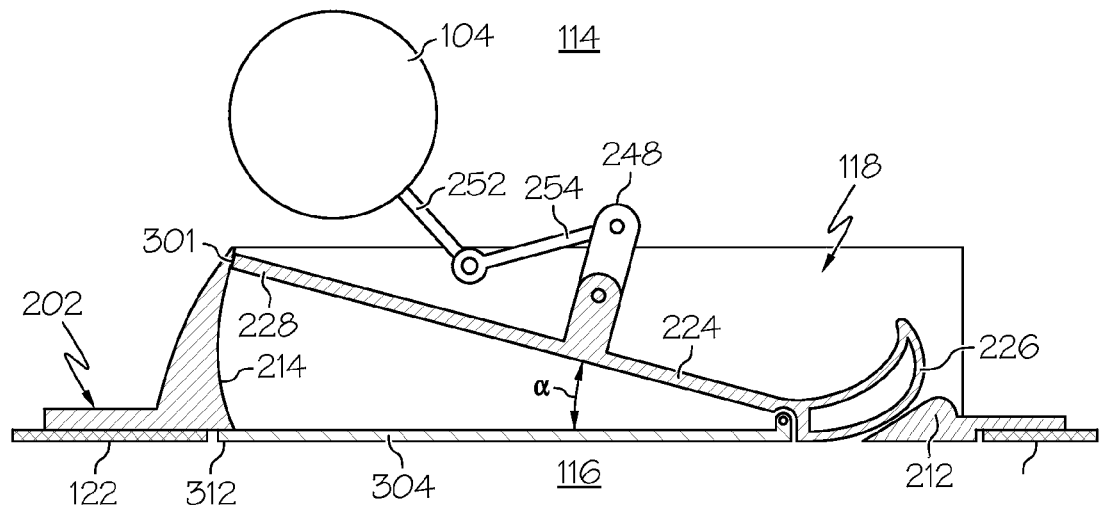
FIGS. 7-9 depict the cross section view of the exemplary thrust recovery outflow valve taken along line 3-3 in FIG. 2 in the closed position, a partial-open position, and full-open position, respectively.
Figure 8:
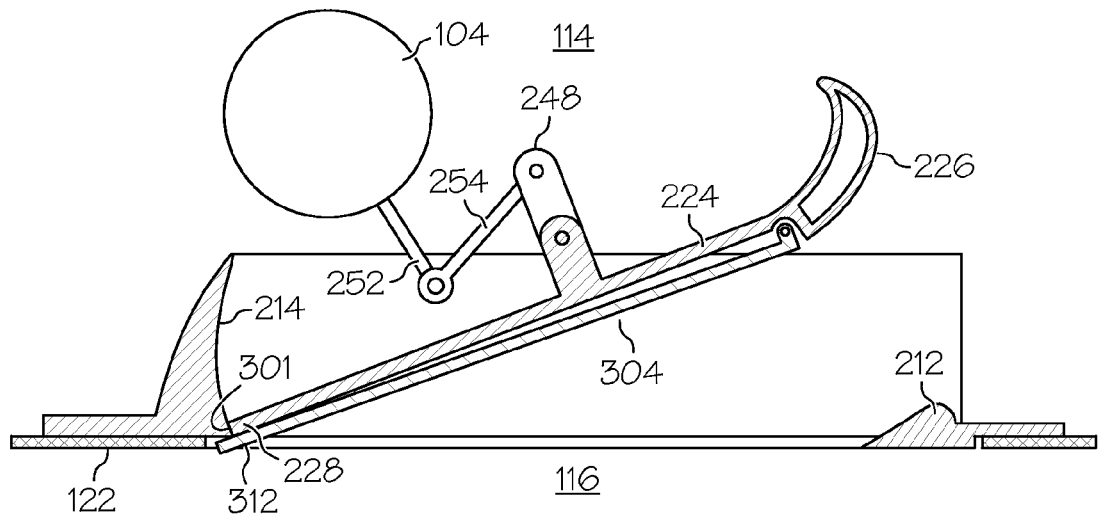
Figure 9:
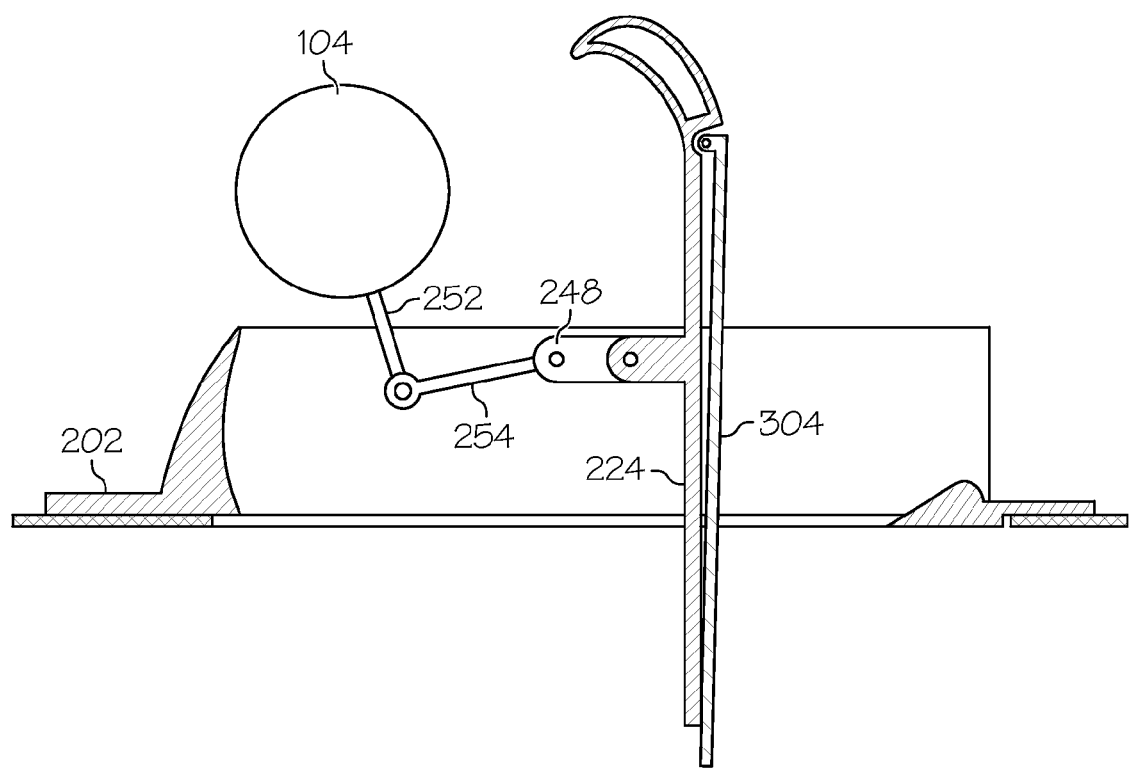

With reference now to FIGS. 7-9, operation of the valve element 118 will be described. When the valve element 118 is in the closed position, which is the position depicted in FIG. 7, the leading edge 226 of the valve door 224 contacts the forward seat 212 of the valve frame 202, and the trailing edge 228 of the valve door 224 contacts, via the one or more seals 301, the aft seat 214 near its top. Thus, as noted above, the valve door 224 is disposed at a non-zero angle (α) relative to the inlet flow port 114. In addition, the second end 312 of the aerodynamic flap 304 engages the valve frame 202 and, when installed in an aircraft, the aircraft exterior skin 122.

Upon receiving an appropriate drive torque from the actuator 104, the valve element 118 may be moved to the full-open position or to a partial-open position. As shown most clearly in FIG. 8, the valve element 118 may be moved to a plurality of partial-open positions in which the leading edge 226 of the valve door 224 does not contact the forward seat 212 while, at the same time, the trailing edge 228 of the valve door 224 continues to contact, via the seal 301, the aft seat 214, and the second end 312 of the aerodynamic flap 304 continues to engage the aircraft exterior skin 122. Thus, the valve element 118 may be moved between the closed position and a predetermined partial-open position, which is the position depicted in FIG. 8, without the trailing edge 228 of the valve door 224 extending beyond the perimeter of the aircraft exterior skin 122 and creating drag. This allows the valve element 118 to be moved to any one of numerous partial-open positions during flight operations without creating unwanted drag.

If, as depicted in FIG. 9, the valve element 118 is moved beyond the predetermined partial-open position, the valve door 224 engages the aerodynamic flap 304 and these two elements move together. It is noted that the position depicted in FIG. 9 is the full-open position. It is additionally noted that the valve element 118 is preferably moved beyond the predetermined partial-open position only during ground operation, just after aircraft takeoff, or just before aircraft landing.

From the above, the following may be readily apparent: (1) when the valve element 118 is in the closed position, the leading edge 226 of the valve door 224 engages the forward seat 212 of the valve frame 202, and the trailing edge 228 of the valve door 224 engages the aft seat 214 of the valve frame 202; (2) when the valve element 118 is in any open position, the leading edge 226 of the valve door 224 does not engage the forward seat 212 of the valve frame 202; (3) when the valve element 118 is between the closed position and the predetermined partial-open position, the trailing edge 228 of the valve door 224 engages the aft seat 214 of the valve frame 202; (4) when the valve element 118 is between the predetermined partial-open position and the full-open position, the trailing edge 228 of the valve door 224 does not engage the aft seat 214 of the valve frame 202; and (5) the second end 312 of the aerodynamic flap 304 engages the valve frame 202 and/or aircraft exterior skin 122 except when the valve element 118 is between the predetermined partial-open position and the full-open position. Thus, between the closed position and the predetermined partial-open position, the aerodynamic flap 304 makes the thrust recovery outflow valve 106 aerodynamically "clean," and the flow angle is optimized at least through the initial valve stroke.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft cabin pressure control system thrust recovery outflow valve, comprising:
    a valve frame configured to be mounted on an aircraft exterior skin, the valve frame including an inner surface, an outer surface, a forward seat, and an aft seat, the inner surface defining a flow passage through the valve frame;
    a single valve door rotationally coupled to the valve frame, and including a leading edge, a trailing edge, and two side edges, the single valve door adapted to receive a drive torque and configured, upon receipt of the drive torque, to rotate between a closed position, a full-open position, and a plurality of partial-open positions between the closed position and the full-open position; and
    an aerodynamic flap including a first end and a second end, the first end coupled to the single valve door, the second end biased toward the trailing edge of the single valve door,
    wherein the second end engages the valve frame when the single valve door is in the closed position and in a plurality of open positions.

2. The thrust recovery outflow valve of claim 1, wherein the valve frame and single valve door are configured such that:
    when the single valve door is in the closed position, the leading edge of the single valve door engages the forward seat of the valve frame, and the trailing edge of the single valve door engages the aft seat of the valve frame;
    when the single valve door is in any open position, the leading edge of the single valve door does not engage the forward seat of the valve frame;
    when the single valve door is between the closed position and a predetermined partial-open position, the trailing edge of the single valve door engages the aft seat of the valve frame; and
    when the single valve door is between the predetermined partial-open position and the full-open position, the trailing edge of the single valve door does not engage the aft seat of the valve frame.

3. The thrust recovery outflow valve of claim 1, wherein the first end of the aerodynamic flap is rotationally coupled to the single valve door.

4. The thrust recovery outflow valve of claim 3, wherein the single valve door further includes a flap stop feature that limits rotation of the aerodynamic flap.

5. The thrust recovery outflow valve of claim 1, further comprising:
    a spring coupled between the single valve door and the aerodynamic flap, the spring configured to urge the second end of the aerodynamic flap toward the valve frame when the single valve door is not between the predetermined partial-open position and the full-open position.

6. The thrust recovery outflow valve of claim 1, wherein the aerodynamic flap comprises a flexible material and is non-rotationally coupled to the single valve door.

7. The thrust recovery outflow valve of claim 1, wherein:
    the flow passage includes an inlet port; and
    the single valve door is disposed at a non-zero angle relative to the inlet port when the single valve door is in the closed position.

8. The thrust recovery outflow valve of claim 1, wherein:
    the single valve door is rotationally coupled to the valve frame via a plurality of hinges; and
    the hinges are located (i) such that any applied torque that closes the single valve door will overcome any applied torque that opens the single valve door and (ii) to limit applied closing torque to reduce actuator drive torque.

9. The thrust recovery outflow valve of claim 1, further comprising:
    one or more seals coupled to the single valve door and engaging the valve frame when the single valve door is in the closed position and in an open position between the closed position and the predetermined partial-open position.

10. The thrust recovery outflow valve of claim 1, wherein the leading edge of the single valve door comprises a curved bellmouth, the curved bellmouth configured to condition fluid flow through the outflow valve when the single valve door is in an open position.

11. The thrust recovery outflow valve of claim 1, wherein:
    the single valve door further comprises a first side and an opposing second side, the first side and the second side each extending between the leading edge and the trailing edge; and
    the thrust recovery valve further comprises a valve actuator coupled to the first side of the single valve door and configured to supply the drive torque to the single valve door.

12. The thrust recovery valve of claim 11, further comprising:
    a door link fixedly coupled to, and extending perpendicular from, the first side of the single valve door;
    a drive link coupled to the valve actuator to receive the drive torque therefrom; and
    a secondary link coupled between the drive link and the door link to transfer the drive torque from the valve actuator to the single valve door.

13. The thrust recovery outflow valve of claim 12, wherein the valve actuator is disposed over, and spaced apart from, the first side of the single valve door.

14. An aircraft cabin pressure control system thrust recovery outflow valve, comprising:
    a valve frame configured to be mounted on an aircraft exterior skin, the valve frame including an inner surface, an outer surface, a forward seat, and an aft seat, the inner surface defining a flow passage through the valve frame, the flow passage including an inlet port;
    a single valve door rotationally coupled to the valve frame, and including a leading edge and a trailing edge, the single valve door adapted to receive a drive torque and configured, upon receipt of the drive torque, to rotate between a closed position, a full-open position, and a plurality of partial-open positions between the closed position and the full-open position; and
    an aerodynamic flap including a first end and a second end, the first end coupled to the single valve door, the second end engaging the valve frame when the single valve door is in the closed position and when the single valve door is between the closed position and the predetermined partial-open position, the second end not engaging the valve frame when the single valve door is between the predetermined partial-open position and the full-open position, wherein the valve frame and single valve door are configured such that:
- when the single valve door is in the closed position, it is disposed at a non-zero angle relative to the inlet port, the leading edge of the single valve door engages the forward seat of the valve frame, and the trailing edge of the single valve door engages the aft seat of the valve frame,
- when the single valve door is in any open position, the leading edge of the single valve door does not engage the forward seat of the valve frame,
- when the single valve door is between the closed position and a predetermined partial-open position, the trailing edge of the single valve door engages the aft seat of the valve frame, and
- when the single valve door is between the predetermined partial-open position and the full-open position, the trailing edge of the single valve door does not engage the aft seat of the valve frame.

15. The thrust recovery outflow valve of claim 14, wherein the first end of the aerodynamic flap is rotationally coupled to the single valve door.

16. The thrust recovery outflow valve of claim 15, wherein the single valve door further includes a flap stop feature that limits rotation of the aerodynamic flap.

17. The thrust recovery outflow valve of claim 14, further comprising:
- a spring coupled between the single valve door and the aerodynamic flap, the spring configured to bias the second end of the aerodynamic flap toward the single valve door.

18. The thrust recovery outflow valve of claim 14, wherein the aerodynamic flap comprises a flexible material and is non-rotationally coupled to the single valve door.

19. The thrust recovery outflow valve of claim 14, wherein:
- the single valve door further comprises a first side and an opposing second side, the first side and the second side each extending between the leading edge and the trailing edge; and
- the thrust recovery valve further comprises a valve actuator coupled to the first side of the single valve door and configured to supply the drive torque to the single valve door.

20. The thrust recovery valve of claim 19, further comprising:
- a door link fixedly coupled to, and extending perpendicular from, the first side of the single valve door;
- a drive link coupled to the valve actuator to receive the drive torque therefrom; and
- a secondary link coupled between the drive link and the door link to transfer the drive torque from the valve actuator to the single valve door.

* * * * *